US008918716B2

(12) United States Patent
Baig et al.

(10) Patent No.: US 8,918,716 B2
(45) Date of Patent: Dec. 23, 2014

(54) CONTEXT-BASED SMART TAGS

(75) Inventors: Rahmathulla Baig, Karnataka (IN);
Ravishankar Belavadi, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 711 days.

(21) Appl. No.: 12/566,243

(22) Filed: Sep. 24, 2009

(65) Prior Publication Data

US 2011/0072346 A1 Mar. 24, 2011

(51) Int. Cl.
*G06F 3/00* (2006.01)
*G06F 9/44* (2006.01)
*G06F 17/30* (2006.01)

(52) U.S. Cl.
CPC ........ *G06F 9/4443* (2013.01); *G06F 17/30899* (2013.01)
USPC .......................................... 715/708; 717/117

(58) Field of Classification Search
CPC ........................... G06F 17/2785; G06F 9/4446
USPC ........... 715/708, 810, 818, 825; 717/114, 117
See application file for complete search history.

(56) References Cited

U.S. PATENT DOCUMENTS

| | | | |
|---|---|---|---|
| 5,155,806 A | 10/1992 | Hoeber | |
| 5,546,521 A | 8/1996 | Martinez | |
| 5,581,684 A | 12/1996 | Dudzik | |
| 5,933,139 A | 8/1999 | Feigner | |
| 5,933,140 A | 8/1999 | Strahorn | |
| 6,990,532 B2 | 1/2006 | Day | |
| 7,373,597 B2 * | 5/2008 | Hagerty et al. | 715/205 |
| 2002/0178008 A1 * | 11/2002 | Reynar | 704/272 |
| 2005/0166182 A1 * | 7/2005 | Wang et al. | 717/114 |
| 2006/0100991 A1 * | 5/2006 | Hartel et al. | 707/3 |
| 2007/0164849 A1 | 7/2007 | Haeberle et al. | |
| 2008/0126932 A1 | 5/2008 | Elad et al. | |

OTHER PUBLICATIONS

Scott Deloach, "Developing Context-Sensitive Help for Web Applications", User First Services, pp. 1-27, http://www.clickstart.net/presentations/wwe3_cs_web.ppt, downloaded Sep. 24, 2009.
Joann Spera, "Creating Context-Sensitive Help for Applications", IBM, Jul. 1, 1999, pp. 1-9, https://www.ibm.com/ developerworks/lotus/library/ls-Creating_context-sensitive_help/.

(Continued)

*Primary Examiner* — Haoshian Shih
(74) *Attorney, Agent, or Firm* — Miles & Stockbridge P.C.

(57) ABSTRACT

A context-based action determiner is configured to facilitate the application of context-based smart tags. The context-based action determiner includes a type determining module configured to determine a type of a context object based on a context in which the context object is being used. The context-based action determiner also includes an action determining module configured to determine one or more context-specific actions that may be performed for the context object based on the type of the context object and to provide the context-specific actions to a user. The context-based action determiner further includes a selection receiving module configured to receive a selection from the user of a context-specific action to be performed and an action performing module configured to perform the selected context-specific action. The type of the context object and the action to be performed are determined based on a smart tag configuration.

20 Claims, 6 Drawing Sheets

(56) References Cited

OTHER PUBLICATIONS

Valeriya Gribova, "A Method of Context-Sensitive Help Generation Using a Task Project", International Journal "Information Theories & Applications", 2008, pp. 391-395, vol. 15, http://www.foibg.com/ijita/vol15/ijita15-4-p14.pdf.

Oracle White Paper, "Oracle Application Development Framework Overview", Jul. 2009, pp. 1-11, http://www.oracle.com/technology/products/adf/pdf/ADF_11_overview.pdf.

JavaServer Faces Technology, Chapter 10, The Java EE 5 Tutorial, Oct. 2008, pp. 285-319, 1) http://java.sun.com/javaee/5/docs/tutorial/doc/JavaEETutorial.pdf.

\* cited by examiner

Fig. 1

RELATED ART

Fig. 2A

| Employees | | | |
|---|---|---|---|
| Name | Email | Address | Phone |
| Rahmathulla Baig | rahmath.baig@oracle.com | #18, Lexinton Towers, Bangalore, India | 918041085033 |
| Sumit Kumar Dubey | sumit.dubey@oracle.com | #18, Lexinton Towers, Bangalore, India | 918041085513 |
| Aqila Gowindaraju | Aqila.Gowindaraju@oracle.com | #18, Lexinton Towers, Bangalore, India | 918041086359 |
| Ravishankar Belavadi | Ravishankar.Belavadi@oracle.com | #18, Lexinton Towers, Bangalore, India | 918041085644 |
| Shakeb Sagheer | Shakeb.Sagheer@oracle.com | #18, Lexinton Towers, Bangalore, India | 918041085644 |
| Chirag K. Patel | Chirag.k.patel@oracle.com | #18, Lexinton Towers, Bangalore, India | 918041085644 |

Fig. 2B

| Name | Email | Address | Phone |
|---|---|---|---|
| Rahmathulla Baig | rahmath.baig@oracle.com | #18, Lexinton Towers, Bangalore, India | 918041085033 |
| Sumit Kumar Dubey | sumit.dubey@oracle.com | #18, Lexinton Towers, Bangalore, India | 918041085513 |
| Agila Govindaraju | Agila.Govindaraju@oracle.com | #18, Lexinton Towers, Bangalore, India | 918041086359 |
| Ravishankar Belavadi | Ravishankar.Belavadi@oracle.com | #18, Lexinton Towers, Bangalore, India | 918041085644 |
| Shakeb Sagheer | Shakeb.Sagheer@oracle.com | #18, Lexinton Towers, Bangalore, India | 918041085644 |
| Chirag K. Patel | Chirag.k.patel@oracle.com | #18, Lexinton Towers, Bangalore, India | 918041085644 |

View Profile / Email

Fig. 2C

| Employees | | | |
|---|---|---|---|
| Name | Email | Address | Phone |
| Rahmathulla Baig | rahmath.baig@oracle.com | #18, Lexinton Towers, Bangalore, India | 918041085033 |
| Sumit Kumar Dubey | sumit.dubey@oracle.com | #18, Lexinton Towers, Bangalore, India | 918041085513 |
| Agila Govindaraju | Agila.Govindaraju@oracle.com | #18, Lexinton Towers, Bangalore, India | 918041086359 |
| Ravishankar Belavadi | Ravishankar.Belavadi@oracle.com | #18, Lexinton Towers, Bangalore, India | 918041085644 |
| Shakeb Sagheer | Shakeb.Sagheer@oracle.com | #18, Lexinton Towers, Bangalore, India | 918041085644 |
| Chirag K. Patel | Chirag.k.patel@oracle.com | Google Maps | |

CONTEXT-BASED SMART TAGS

FIELD

One embodiment is directed generally to computer systems, and in particular to web applications in computer systems.

BACKGROUND

When web applications are designed and implemented, there are generally numerous business objects that are identified and built into the system. These business objects often have context around them and need to perform context-sensitive operations that belong to different components. Many applications are built on use cases identified at the time the application was designed, and as such, the operations are predefined and coded accordingly. This often leads to components not being well connected to one another, especially when enhancements are incorporated with actions to be performed in multiple contexts.

SUMMARY

In an embodiment, a context-based action determiner is configured to facilitate the application of context-based smart tags. The context-based action determiner includes a type determining module configured to determine a type of a context object based on a context in which the context object is being used. The context-based action determiner also includes an action determining module configured to determine one or more context-specific actions that may be performed for the context object based on the type of the context object and to provide the context-specific actions to a user. The context-based action determiner further includes a selection receiving module configured to receive a selection from the user of a context-specific action to be performed and an action performing module configured to perform the selected context-specific action. The type of the context object and the action to be performed are determined based on a smart tag configuration.

BRIEF DESCRIPTION OF THE DRAWINGS

In order that the embodiments of the invention will be readily understood, a more particular description of the invention briefly described above will be rendered by reference to specific embodiments that are illustrated in the appended drawings. While it should be understood that these drawings illustrate only typical embodiments of the invention and are not therefore to be considered to be limiting of its scope, the invention will be described and explained with additional specificity and detail through the use of the accompanying drawings, in which.

DETAILED DESCRIPTION

In some embodiments, a context-based action determiner is configured to facilitate the application of context-based "smart" tags. The context-based smart tags may be defined in an Extensible Markup Language ("XML") file and may contain context types and actions to be performed for one or more context objects. A context object is an object around which context information that needs to be presented is available. Context-sensitive actions, or smart tag actions, are operations that are responsive to the context of the context object. Based on the smart tag configurations in the file, the context-based action determiner may determine a type of a context object based on a context in which the context object is being used. The context-based action determiner may then determine one or more context-specific actions that may be performed for the context object based on the type thereof and provide the context-specific actions to a user. Based on a user selection of a context-specific action, the context-specific action determiner may then perform the selected context-specific action. Smart tags may allow application components to be loosely coupled to one another, yet be able to invoke cross-component actions. Smart tags may enable hot pluggability into a system, meaning that context-sensitive applications and information may be dynamically hooked in. This provides a loosely integrated, yet powerful system that maintains context and performs the appropriate actions based thereupon.

While not limited thereto, some embodiments of the present invention may use JavaServer Faces ("JSF") technology, which is a server-side user interface component framework for Java technology-based web applications. Some embodiments may use Oracle Application Development Framework ("ADF"), which provides infrastructure code for implementing Service Oriented Architecture ("SOA") based applications. While not discussed in further detail herein, these technologies are within the scope of some embodiments of the present invention and would be readily understood by a person of ordinary skill in the art. It would also be appreciated by one of ordinary skill in the art that other software technologies and languages other than Java may be used.

With software that supports smart tags, developers can define key business objects in an application, such as those representing people, products and organizations. Developers can further define a set of actions available at runtime that are presented when a specific data value is associated with a smart tag. Developers of a business object in a company may control behavior and navigation, as opposed to a third party that does not understand the object or the context thereof as it pertains to a business's needs.

The smart tag model allows association of different smart tags to the same business object when the business object is displayed in a different context. Consider the case where a web page has a "My Buddy List" component and a "My Direct Reports" component. Both of these components display a list of people: one shows a list of people who are designated as buddies and the other shows a list of people who are managed. For the My Buddy List component, the "Name" column may be tagged with a smart tag having actions such as Send Email, Send Short Message Service ("SMS") Message, etc., while for the My Direct Reports component, the Name columns may be tagged with a smart tag having actions such as View Employment History, View Vacation History, etc.

Smart tag actions are not necessarily meant to facilitate native operations of components or native operations of data items shown through the components. For example, a "Discussion Forum" service could allow operations like Create, Edit and Delete for each item. Smart tags do not necessarily provide menus for these operations, although it is feasible to do so. In some embodiments, an objective is to provide a design for accomplishing the requirements of a contextual actions framework by building the entire framework around ADF technology and keeping the integration points loosely coupled so as to avoid code changes for extensions that applications may need. Another objective may be to make a "contextual actions" view extensible and to provide hooks to plug in new views for context objects or to provide addons to the context objects and views.

Developing an ADF Page that is Smart Tag Enabled

Consider the following JSPx page that is designed to show a list of employee details including name, e-mail address, residence address and telephone number.

```
<?xml version='1.0' encoding='UTF-8'?>
<jsp:root xmlns:jsp="http://java.sun.com/JSP/Page" version="2.1"
    xmlns:h="http://java.sun.com/jsf/html"
    xmlns:f="http://java.sun.com/jsf/core"
    xmlns:af="http://xmlns.oracle.com/adf/faces/rich">
<jsp:directive.page contentType="text/html;charset=UTF-8"/>
<f:view>
    <af:document>
        <af:form>
            <af:panelGroupLayout>
                <af:panelBox title="Main Page">
                    <af:table value="#{empBean.employees}"
                        var="row">
                        <af:column headerText="Name">
                            <af:outputText
                                value="#{row.name}"/>
                        </af:column>
                        <af:column headerText="Email">
                            <af:outputText
                                value="#{row.email}"/>
                        </af:column>
                        <af:column headerText="Address">
                            <af:outputText
                                value="#{row.address}"/>
                        </af:column>
                        <af:column headerText="Phone">
                            <af:outputText
                                value="#{row.phone}"/>
                        </af:column>
                    </af:table>
                </af:panelBox>
            </af:panelGroupLayout>
        </af:form>
```

-continued

```
    </af:document>
</f:view>
```

Figure 1:
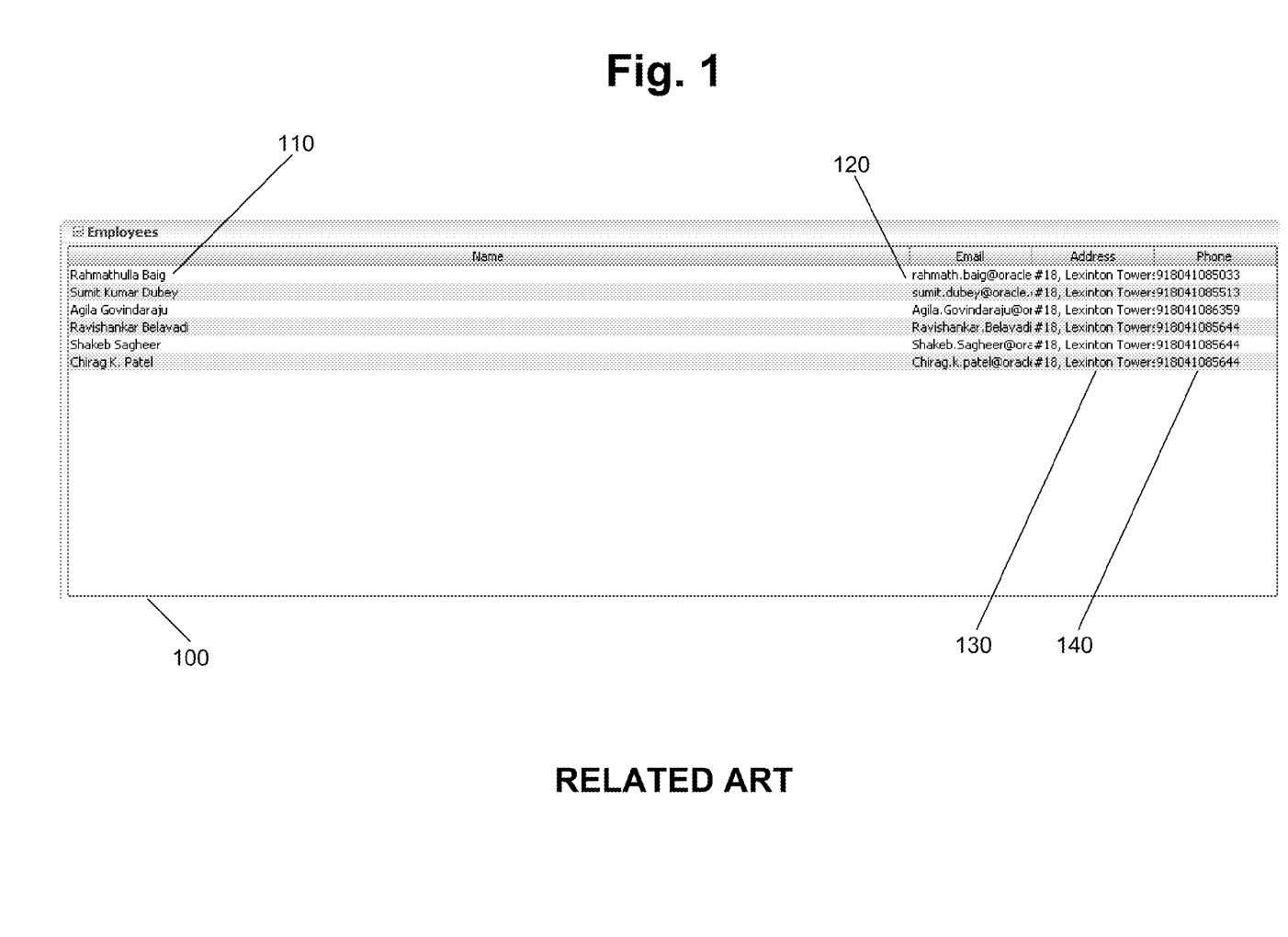
FIG. 1 is a screenshot of a web page that lacks context-sensitive information.

The above sample ADF page is a non-context-sensitive page. Such a page 100 may appear as illustrated in FIG. 1. As can be seen, page 100 displays names 110, e-mail addresses 120, residence addresses 130 and phone numbers 140. Regardless of the context in which the page appears, the page will have the same functionality.

In order to enable smart tags on the above ADF page and bring about the corresponding context view and actions, in some embodiments, the following operations may be taken:

1. Identify the information on which context views and actions should be enabled;
2. Place the identified information within a context tag, such as <st:contextObject>;
3. Provide the <st:contextObject> tag with a mandatory "type" attribute that defines the type of the context object; and
4. Drop an "actions-enabler" task flow on the page.

In some embodiments, the appropriate tags and task flows may be added to the page via drag-and-drop functionality using a development tool such as JDeveloper® from Oracle Corp.

By way of example, take the case that a developer decides to define context-sensitive actions around the data items "Name" and "Address" from above. "Name" is the name of a person in this context, so the type may be "person". "Address" is either a personal address or a business address, so the type may be "address". Having decided which information should be context-sensitive, the developer may then modify the page as follows (additions are marked in bold):

```
<?xml version='1.0' encoding='UTF-8'?>
<jsp:root xmlns:jsp="http://java.sun.com/JSP/Page" version="2.1"
    xmlns:h="http://java.sun.com/jsf/html"
    xmlns:f="http://java.sun.com/jsf/core"
    xmlns:af="http://xmlns.oracle.com/adf/faces/rich"
    xmlns:st="http://xmlns.oracle.com/webcenter/smartTag" >
<jsp:directive.page contentType="text/html;charset=UTF-8"/>
    <f:view>
        <af:document>
            <af:form>
                <af:region value="#{bindings.actionenabler1.regionModel}"
                    id="actio1"/>
                <af:panelGroupLayout>
                    <af:panelBox title="Main Page">
                        <af:table value="#{empBean.employees}" var="row">
                            <af:column headerText="Name">
                                <st:contextObject type="person"/>
                                    <af:outputText value="#{row.name}"/>
                                </st:contextObject>
                            </af:column>
                            <af:column headerText="Email">
                                <af:outputText value="#{row.email}"/>
                            </af:column>
                            <af:column headerText="Address">
                                <st:contextObject type="address"/>
                                    <af:outputText value="#{row.address}"/>
                                </st:contextObject>
                            </af:column>
                            <af:column headerText="Phone">
                                <af:outputText value="#{row.phone}"/>
```

```
            </af:column>
          </af:table>
        </af:panelBox>
      </af:panelGroupLayout>
    </af:form>
  </af:document>
</af:view>
```

The above page contains an additional <af:region> tag that is a dynamic region that may exist on this page or on a page template. This region should be available in each context-sensitive page rather than as part of a fragment. This region enables context sensitive action presentation via a popup menu. Each data item that is to be context-sensitive is now surrounded with a <st:contextObject> tag. The context object is the trigger point for contextual actions to bring about the corresponding actions and associated view for this object. Each context object has a "type" attribute defining the data or object type. In some embodiments, each action is associated with a type and the types are defined in a smart tag configuration file. Optionally, a context object may have a "value" attribute that is supplied to actions that are associated with the type of the context object so that the action operates on the value. For instance, a "phone call" action may be supplied with a phone number from the "value" attribute. An action listener may be implemented, either designated in the <st:contextObject> tag or supplied by default, that performs an associated action for the context object when an event occurs.

Figure 2A:
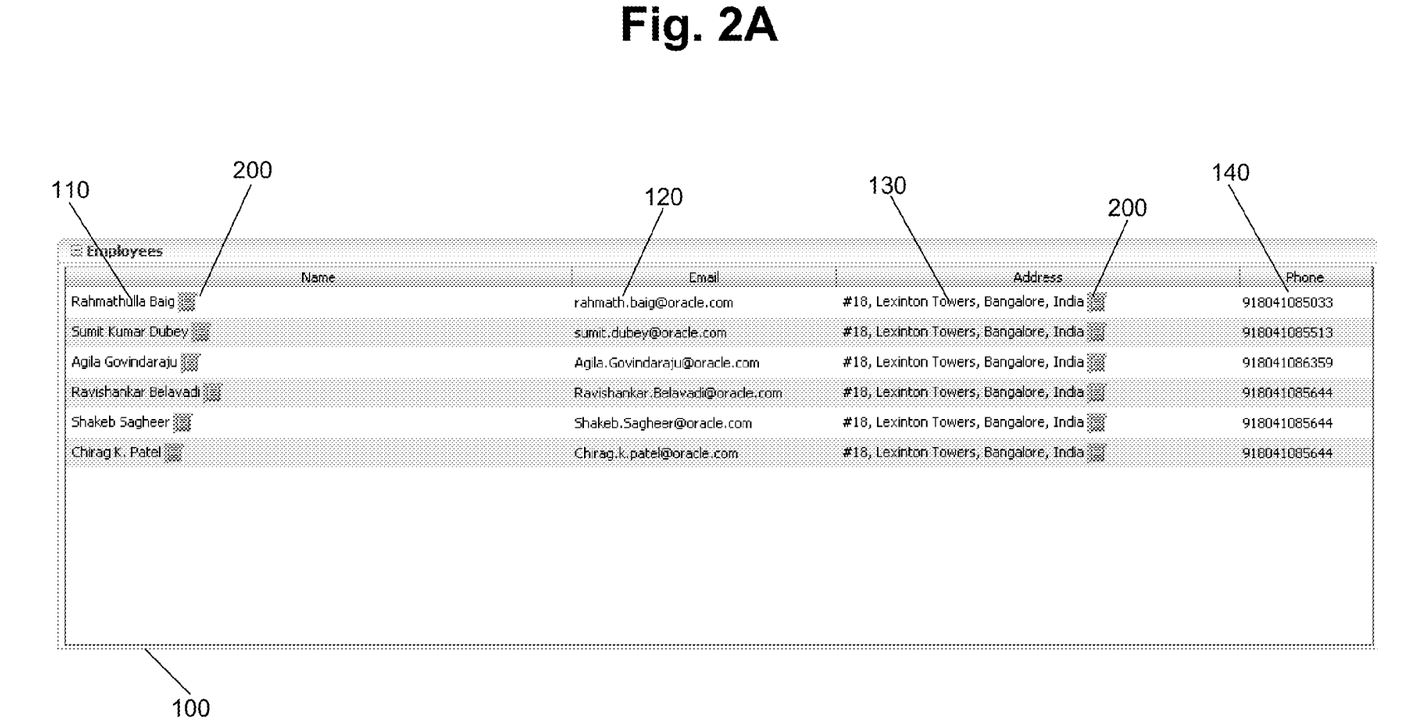
FIG. 2A is a screenshot of a context-sensitive web page according to an embodiment of the present invention.
Figure 2B:
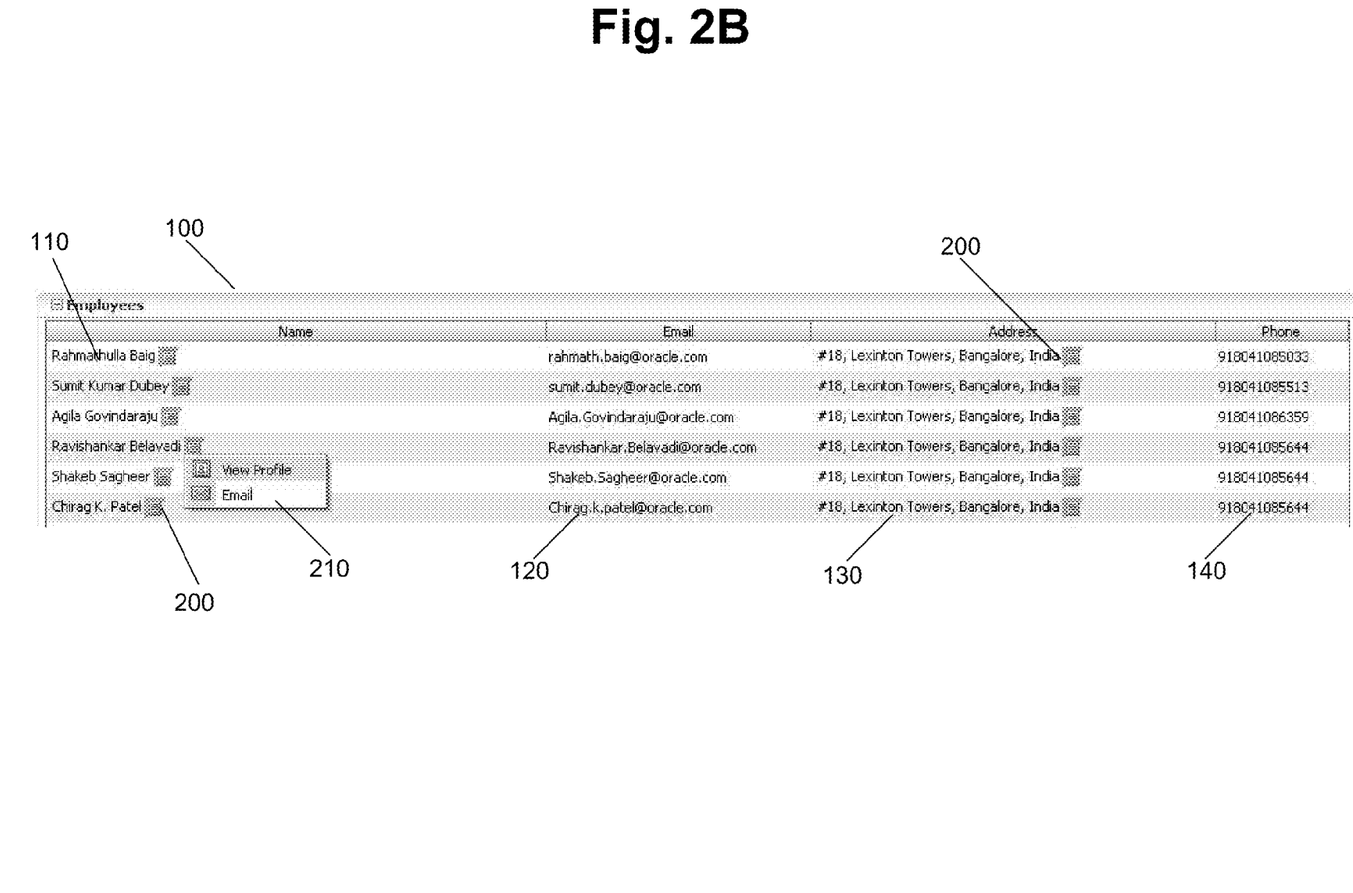
FIG. 2B is a screenshot of a context-sensitive web page with a popup menu according to an embodiment of the present invention.
Figure 2C:
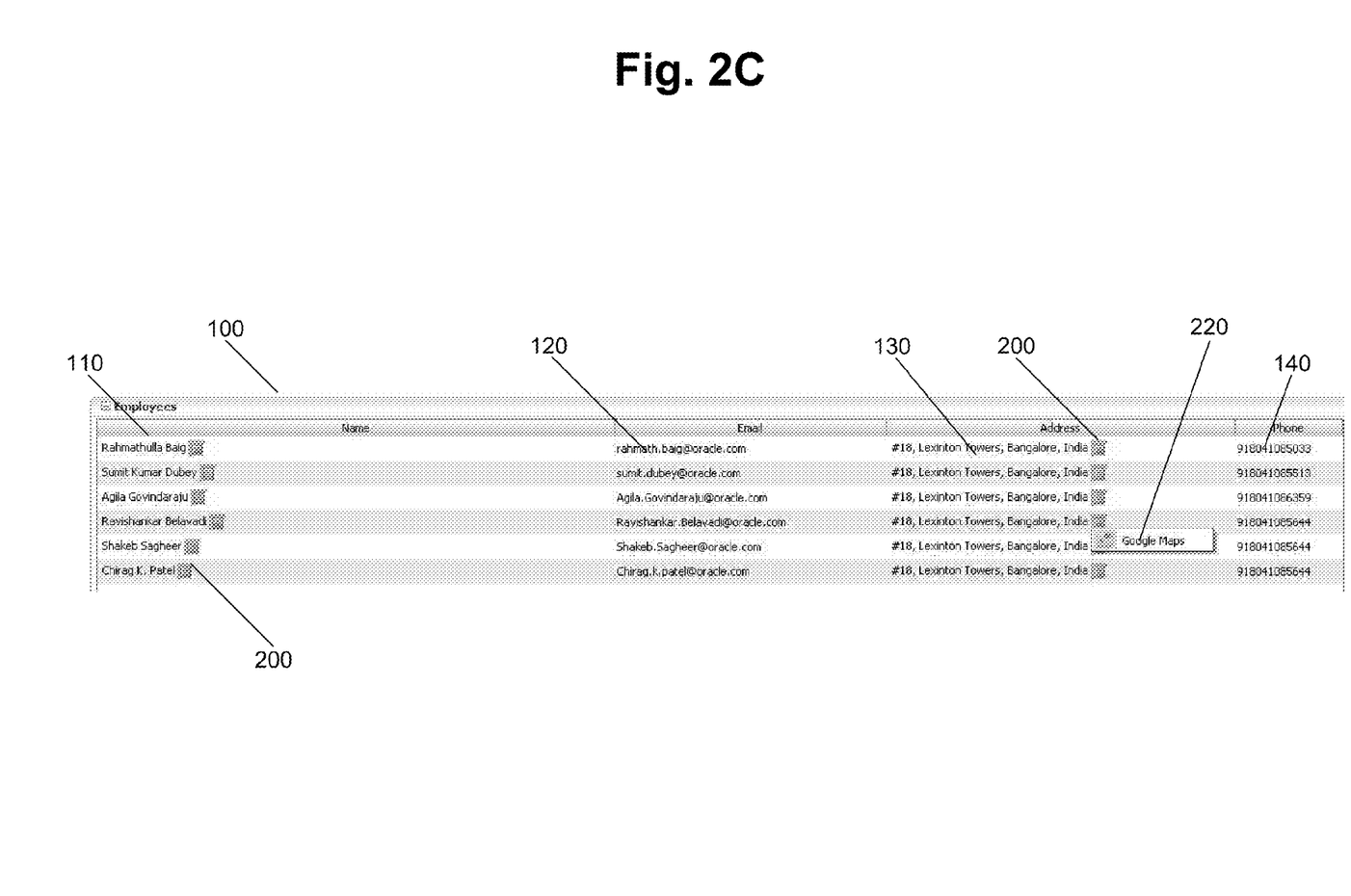
FIG. 2C is a screenshot of a context-sensitive web page with another popup menu according to an embodiment of the present invention.

A context-sensitive page has now been created where objects like person and address are known types and any context views and actions corresponding to the objects will be pulled in and presented in a popup menu containing relevant actions. As illustrated in FIG. 2A, the <st:contextObject> tag causes a context indicator icon 200 to be displayed for the associated information, such as each name 110 and each address 130. Context indicator icon 200, the associated information, or both, may be made clickable. When an end user clicks on context indicator icon 200, a menu containing actions corresponding to the associated information type (i.e., person or address) may appear by default, as illustrated in FIGS. 2B and 2C. As illustrated in FIG. 2B, when the name or icon for Shakeb Sagheer is selected, a popup menu 210 appears that offers action options of viewing a profile or preparing an e-mail for that person. Similarly, as illustrated in FIG. 2C, when the address for Shakeb Sagheer is selected, a popup menu 220 appears that offers a link to Google Maps® for that address.

Defining Types for Context Objects

Configurations for context objects may be managed within a configuration file. Multiple configuration files may be merged into a single in-memory repository. Having multiple configuration files may assist with modularization of the configurations and in making maintainability easier. This may be particularly useful when multiple groups of developers are involved in producing smart tag actions.

In some embodiments, the set of types that can be used for each context object are defined in an XML file, called in one embodiment "smarttag-config.xml". For the example above with types "person" and "address", the smarttag-config.xml file may contain the following:

```
<smarttag-config
  xmlns="http://xmlns.oracle.com/webcenter/collab/smarttag">
  <group>
    <type-config>
      <type name="person"/>
```

```
      <type name="address"/>
    </type-config>
  </group>
</smarttag-config>
```

Accordingly, two context types are defined above: person and address. In some embodiments, a developer may also define extensions of a type. For instance, the type "supplier" may extend from the type "person" as follows:

```
<smarttag-config
  xmlns="http://xmlns.oracle.com/webcenter/collab/smarttag">
  <group>
    <type-config>
      <type name="person"/>
      <type name="supplier" heir="person"/>
    </type-config>
  </group>
</smarttag-config>
```

The "heir" attribute of the type specifies which other type(s) that are inherited. One benefit of defining inherited types is that the actions associated with the "supplier" type and the "person" type may be aggregated. Multiple heirs may be specified with a delineator such as a comma in some embodiments.

Configuring Actions with Smart Tags

In order to recognize actions, the smarttag-config.xml file may be configured as follows in some embodiments:

```
<smarttag-config
  xmlns="http://xmlns.oracle.com/webcenter/collab/smarttag">
  <group>
    <type-config>
      <type name="person"/>
      <type name="address"/>
    </type-config>
    <action-config>
      <action   id="<unique action ID for this group>"
                name="<label of the action>"
                description="<action short description
                  for tool tip>"
                icon="<URI providing location of icon
                  associated with action>"
                supportedTypes="delineated types (e.g.,
                  person, address)"
                actionClass="<qualified class name of
                  action implementation>"
      />
    </action-config>
  </group>
</smarttag-config>
```

Other icons, such as a depressed icon and a disabled icon, may also be defined in some embodiments. The supportedTypes parameter includes the context object types on which the action can be triggered. An implementation for a telephone call action may be as follows:

```
<smarttag-config xmlns="http://xmlns.oracle.com/webcenter/collab/smarttag">
    <group>
        <type-config>
            <type name="person"/>
            <type name="address"/>
        </type-config>
        <action-config>
            <action  id="Call"
                    name="Phone Call"
                    description="Makes a phone call on the user's mobile number"
                    icon="/adf/webcenter/phone.png"
                    supportedTypes="phone"
                    actionClass="oracle.webcenter.collab.smarttag.sample.PhoneCall"
                    />
        </action-config>
    </group>
</smarttag-config>
```

It is also possible in some embodiments to make an action appear for all context types.

Defining a Smart Tag Action

In some embodiments, the smart tag framework may expose an interface. A class may then be written that extends this interface. For instance, an interface called "Action" may be as follows:

```
public interface Action
{
    public String getId( );
    public String getName( );
    public String getDescription( );
    public String getIcon( );
    public String getHoverIcon( );
    public String getDepressedIcon( );
    public String getDisabledIcon( );
    public String getIconPosition( );
    public boolean isAvailable( );
    public boolean isClientAction( );
```

-continued

```
    public ActionConfig.ActionInfo getActionInfo( );
    public void addActionListener(String type, SmartTagListener
    listener);
    public void removeActionListener(String type, SmartTagListener
    listener);
    public List<SmartTagListener> getActionListeners(String type);
    public Object processAction(SmartTagEvent event);
}
```

Because the Action interface may be complex for each developer to implement every time a new action is created, in some embodiments, an abstract class (called "AbstractAction" in this example) may be provided that implements all of the methods of the Action interface with the exception of the processAction method. When an action is performed, processAction will be triggered and SmartTagEvent will be supplied as an argument to the method. In the case of a greeting action, the implementation may be as follows:

```
package oracle.webcenter.collab.smarttag.sample;
import oracle.webcenter.collab.smarttag.action.AbstractAction;
import oracle.webcenter.collab.smarttag.event.SmartTagEvent;
public class GreetingAction extends AbstractAction
{
    public Object processAction(SmartTagEvent event)
    {
        ActionContext ctx = event.getActionContext( );
        // Since we only expose the greeting to people, we expose this action
        // to "person" and the value below is expected to be the name of the
        // person.
        String name = (String) ctx.getValue( );
        // Now we launch a dialog where we show "Hello, <Person>!" and
        // populate the name of the person onto the Map pageFlowScope.
        RequestContext ctx = RequestContext.getCurrentInstance( );
        Map pageFlowScope = ctx.getPageFlowScope( );
        pageFlowScope.put("person.name", name);
        // Now launch the dialog and present a view that shows the greeting,
        // assuming that the location of the view is the path listed below.
        FacesContext facesCtx = FacesContext.getCurrentInstance( );
        ViewHandler viewHandler = facesCtx.getApplication( ).getViewHandler( );
        UIViewRoot rootView =
        viewHandler.createView(facesCtx, "/oracle/webcenter/pages/greeting.jsf");
        // Now we launch the dialog to show the greeting in a separate browser
        // window.
        ctx.launchDialog(rootView, pageFlowScope, null, true, null);
    }
}
```

The implementation details of the processAction method are as follows. First, the method attempts to retrieve the value associated with the contextObject. The information supplied in <st:contextObject> is made available to the Action class via the ActionContext object in the SmartTagEvent. The ActionContext instance is extracted from a SmartTagEvent.getActionContext( ) method. To get the value associated with the <st:contextObject>, ActionContext.getValue( ) is invoked. This method will return the same object set on the contextObject via <st:contextObject value="#{row}">. Here, per the above, it is assumed that the returned value is the name of a person. Then, a new dialog is launched that takes the user to a specific page where the greeting is presented.

Creating Declarative Actions

In some embodiments, the smart tag framework allows the creation and use of declarative actions rather than writing an Action class each time a new action is needed. A declarative action is an action that is created simply by declaring the action definition in the configuration file, such as smarttag-config.xml. Declarative actions are particularly suitable to performing redundant operations such as opening a URL in a popup or browser window, opening a task flow in a popup or browser window, and invoking a client-side action, such as via Javascript.

The parameters for declarative actions may be provided using metadata that is associated with the action in the action definition. For example, to define the action for the greeting example in a declarative manner, the following may be implemented:

```
<action     id="GreetingAction"
            name="Greeting"
            description="Prompts the user with a greeting"
            icon="/adf/webcenter/hello.png"
            supportedTypes="person"
            actionClass="oracle.webcenter.collab.smarttag.action.URIAction"/>
    <metadata>
            <property name="uri" value="/oracle/webcenter/pages/greeting.jsf"/>
            <property name="launch.window.type" value="NEW_WINDOW"/>
            <property name="window.width" value="500"/>
            <property name="window.height" value="800" />
            <property name="window.top" value="200" />
            <property name="window.left" value="300" />
    </metadata>
</action>
```

The metadata tag may be processed by the declarative action and may perform the operations of the action at runtime. Accordingly, in some embodiments, the greeting action can be defined declaratively rather than programming the action method to launch a dialog.

Figure 3:
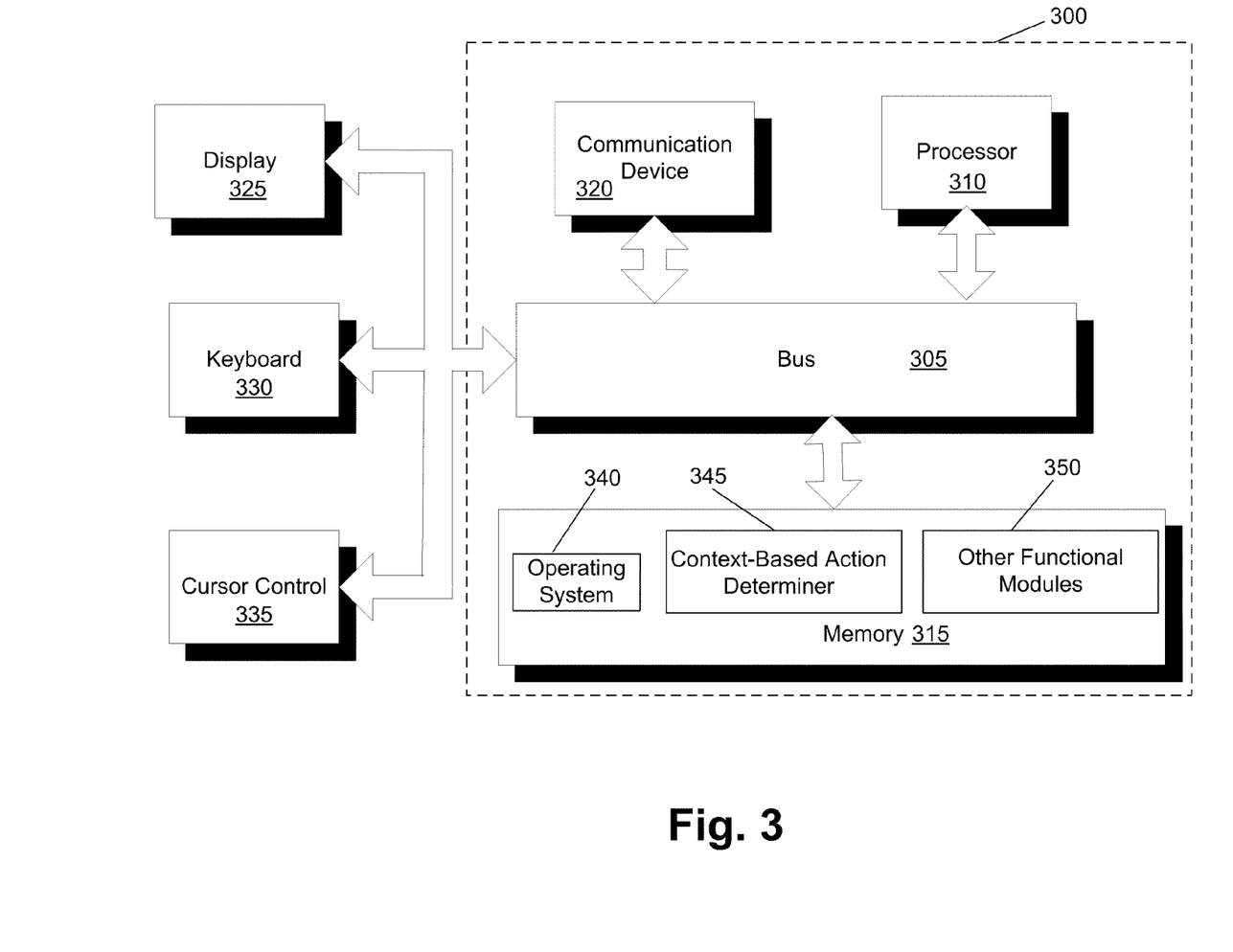
FIG. 3 is a block diagram illustrating a server having a context-based action determiner that can implement an embodiment of the present invention.

FIG. 3 is a block diagram of a server 300 that can implement an embodiment of the present invention. Server 300 includes a bus 305 or other communication mechanism for communicating information, and a processor 310 coupled to bus 305 for processing information. Processor 310 may be any type of general or specific purpose processor, including a central processing unit ("CPU") or application specific integrated circuit ("ASIC"). Server 300 further includes a memory 315 for storing information and instructions to be executed by processor 310. Memory 315 can be comprised of any combination of random access memory ("RAM"), read only memory ("ROM"), flash memory, cache, static storage such as a magnetic or optical disk, or any other types of computer readable media or combination thereof. Additionally, server 300 includes a communication device 320, such as a network interface card, to provide access to a network. Therefore, a user may interface with server 300 directly, or remotely through a network or any other method.

Computer readable media may be any available media that can be accessed by processor 310 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 310 is further coupled via bus 305 to a display 325, such as a Liquid Crystal Display ("LCD"), for displaying information to a user, such as server status information. A keyboard 330 and a cursor control device 335, such as a computer mouse, is further coupled to bus 305 to enable a user to interface with server 300.

In one embodiment, memory 315 stores software modules that provide functionality when executed by processor 310. The modules include an operating system 340 that provides operating system functionality for server 300. The modules further include a context-based action determiner 345 that is configured to facilitate context-based smart tags. Server 300 can be part of a larger system such as a cluster computing system, a distributed computing system, a cloud computing system, a "server farm" or any other system having multiple servers and/or computing devices. Server 300 will typically include one or more additional functional modules 350 to include additional functionality. In some embodiments, context-based action determiner 345 may be part of operating system 340 or part of one or more other functional modules included in other functional modules 350.

It should be noted that many of the functional features described in this specification have been presented as modules in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be at least partially implemented in software for execution by various types of processors. An identified unit of executable code in a software module may, for instance, comprise one or more physical or logical blocks of computer instructions which may, for instance, be organized as an object, procedure or function. Nevertheless, the executables of an identified module need not be physically located together, but may comprise disparate instructions stored in different locations that, when joined logically together, comprise the module and achieve the stated purpose for the module. Modules may be stored on a computer-readable medium, which may be, for instance, a hard disk drive, a flash device, random access memory ("RAM"), a tape drive, an optical drive, a compact disk having read-only memory ("CD-ROM") or a digital video disk having read-only memory ("DVD-ROM"), or any other such medium used to store data. The medium may be read-only or read/write.

Indeed, a unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 4:
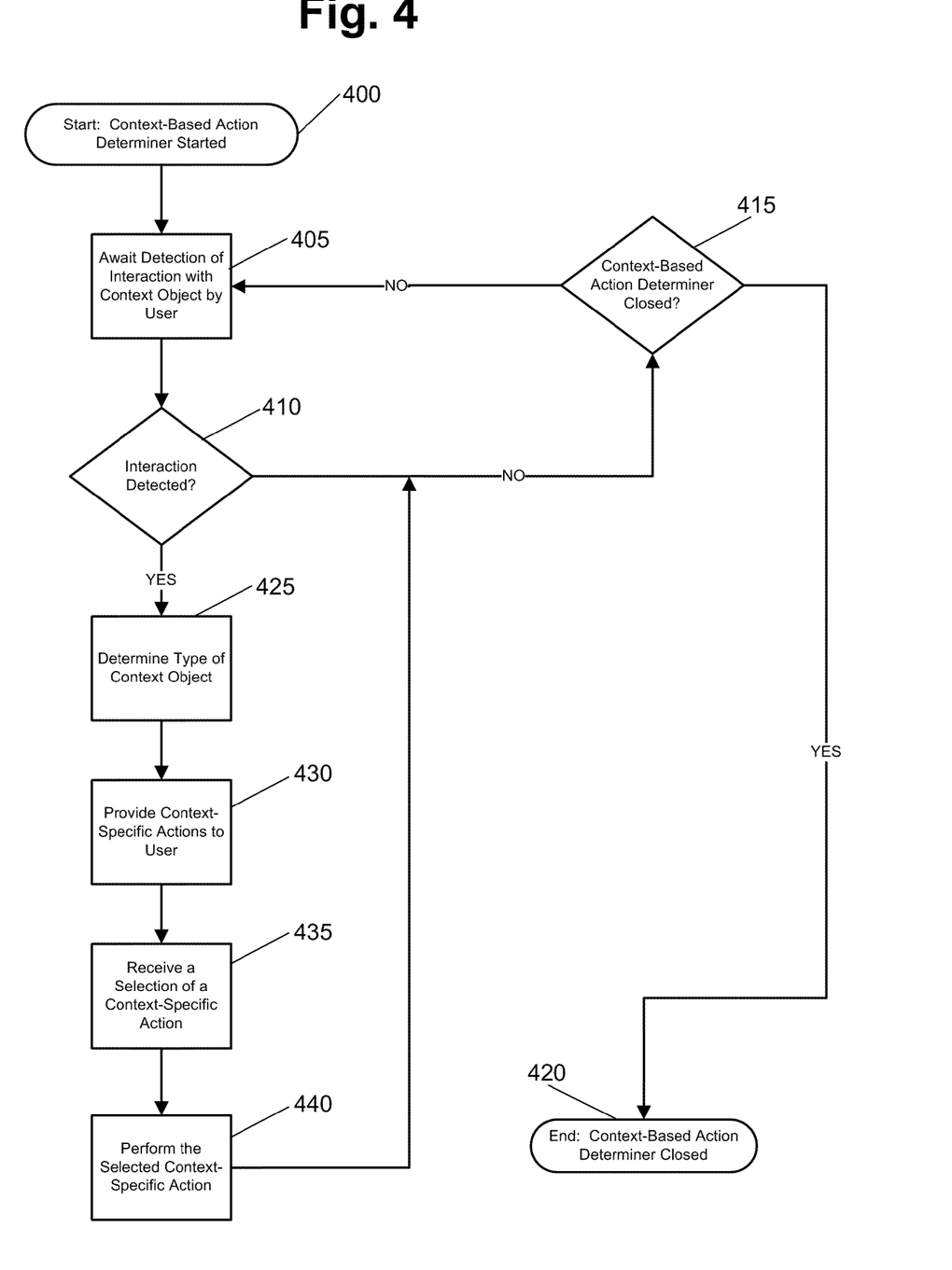
FIG. 4 is a flow diagram illustrating a process flow for facilitating the application of context-based smart tags according to an embodiment of the present invention.

FIG. 4 is a flow diagram illustrating a process flow for facilitating the application of context-based smart tags according to an embodiment of the present invention. In some embodiments, the functionality of FIG. 4 is implemented by software stored in memory or other computer readable media, and executed by a processor. In other embodiments, the functionality may be performed by hardware (e.g., through the use of an ASIC, a programmable gate array ("PGA"), a field programmable gate array ("FPGA"), etc.), or any combination of hardware and software.

In some embodiments, the process of FIG. 4 may be performed, for example, by server 300 of FIG. 3 via context-based action determiner 345. In FIG. 3, the process flow begins with context-based action determiner 345 being started at 400. The computer on which context-based action determiner 345 is running, such as a server, then awaits detection of an interaction with a context object by a user at 405. Such an interaction may include, for example, placing a mouse over an icon associated with a context object, such as a name of a person as discussed above. If an interaction is not detected at 410, and if context-based action determiner 345 has not been closed at 415, context-based action determiner 345 will continue to await detection of an interaction with a context object by a user at 405. Otherwise, context-based action determiner 345 closes at 420.

If an interaction is detected at 410, context-based action determiner 345 determines the type of the context object based on the context in which the context object is being used at 425. For instance, if a context object for a person has type "employee", this type will be determined by context-based action determiner 345. Context-based action determiner 345 then determines one or more context-specific actions that may be performed for this type of context object and provides the one or more context-specific actions to the user at 430. These actions may be provided, for example, via a graphical user interface, an audio or video message, or any other means for communicating with a user. Once the context-specific actions have been presented to the user, context-based action determiner 345 receives a selection of a context-specific action to perform from the user at 435. Context-based action determiner 345 then performs the selected action at 440 based on the type of the context object and the selected action to be performed in a smart tag configuration, such as smarttag-config.xml as discussed above.

As disclosed, in some embodiments, a context-based action determiner is configured to facilitate the application of context-based smart tags. The context-based smart tags may be defined in an Extensible Markup Language ("XML") file and may contain context types and actions to be performed for one or more context objects. Based on the smart tag configurations in the file, the context-based action determiner may determine a type of a context object based on a context in which the context object is being used. The context-based action determiner may then determine one or more context-specific actions that may be performed for the context object based on the type thereof and provide the context-specific actions to a user. Based on a user selection of a context-specific action, the context-specific action determiner may then perform the selected context-specific action.

While the term "server" has been used in the description of some embodiments of the present invention, the invention may be applied to many types of network computing devices. For purposes of this invention, the term "server" includes rack computing systems, cloud computing systems, distributed computing systems, personal computers, laptops, cell phones, personal digital assistants, tablet computing devices, mainframes, any networked devices that perform computing operations, and any of these physical servers. A server may also be an application server or web server and may be run as software on a single physical server or distributed across multiple physical servers.

One having ordinary skill in the art will readily understand that the invention as discussed above may be practiced in a different order, and/or with hardware elements in configurations that are different than those that are disclosed. Therefore, although the invention has been described based upon these preferred embodiments, it would be apparent to, and readily appreciated by, those of ordinary skill in the art that certain modifications, variations, and alternative constructions would be apparent, while remaining within the spirit and scope of the invention. In order to determine the metes and bounds of the invention, therefore, reference should be made to the appended claims.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

What is claimed is:

1. A computer-readable medium having instructions stored thereon that, when executed by a processor, cause the processor to facilitate the application of context-based smart tags, the facilitating comprising:
    determining a type of a context object in a web page based on a context tag, comprising a start-tag and a matching end-tag, that surrounds the context object source code in the web page, the context tag defining the type of the context object;
    determining one or more context-specific actions that may be performed for the context object based on the context object type and a smart tag framework comprising:

a type tag including a start-tag, a matching end-tag and a list of context object types, and a plurality of action tags, each action tag including a start-tag, a matching end-tag, a first parameter identifying one or more supported context object types and a second parameter identifying the name of an action class defining the action to be performed;

receiving a selection from a user of the context object or a context indicator icon associated with, and displayed proximate to, the context object;

providing the context-specific actions for the context object to the user;

receiving a selection from the user of a context-specific action to be performed; and performing the selected context-specific action;

wherein the smart tag framework is defined in one or more smart tag configuration files.

2. The computer-readable medium of claim 1, wherein providing the context-specific actions to the user comprises displaying a popup menu populated with options based on the type of the context object.

3. The computer-readable medium of claim 1, wherein the selected action for the context object is performed based on an occurrence of an event detected by an action listener.

4. The computer-readable medium of claim 1, wherein the type of the context object changes based on how the context object is used.

5. The computer-readable medium of claim 1, wherein the smart tag configuration groups multiple actions into a single group.

6. The computer-readable medium of claim 1, wherein the action is a declarative action and the action tag includes metadata defining parameters for the action to be performed.

7. The computer-readable medium of claim 1, wherein the smart tag configuration file is an Extensible Markup Language file.

8. A context-based action determiner that facilitates the application of context-based smart tags, comprising:

a processor programmed to perform as:

a type determining module configured to determine a type of a context object in a web page based on a context tag, comprising a start-tag and a matching end-tag, that surrounds the context object source code in the web page;

an action determining module configured to determine one or more context-specific actions that may be performed for the context object based on the context object type and a smart tag framework, and to provide the context-specific actions to a user, the smart tag framework including:

a type tag including a start-tag, a matching end-tag and a list of context object types, and a plurality of action tags, each action tag including a start-tag, a matching end-tag, a first parameter identifying one or more supported context object types and a second parameter identifying the name of an action class defining the action to be performed;

a selection receiving module configured to receive a selection from the user of the context object or a context indicator icon associated with, and displayed proximate to, the context object, and to receive a selection from the user of a context-specific action to be performed; and an action performing module configured to perform the selected context-specific action;

wherein the smart tag framework is defined in one or more smart tag configuration files.

9. The context-based action determiner of claim 8, wherein the action performing module is further configured to display a popup menu that is populated with options based on the type of the context object.

10. The context-based action determiner of claim 8, wherein the action performing module is configured to perform the selected action for the context object based on an occurrence of an event detected by an action listener.

11. The context-based action determiner of claim 8, wherein the type of the context object changes based on how the context object is used.

12. The context-based action determiner of claim 8, wherein the smart tag configuration comprises multiple files.

13. A computer-implemented method for facilitating the application of context-based smart tags, comprising:

determining a type of a context object in a web page based on a context tag, comprising a start-tag and a matching end-tag, that surrounds the context object source code in the web page;

determining one or more context-specific actions that may be performed for the context object based on the context object type and a smart tag framework, and providing the context-specific actions to a user, the smart tag framework including:

a type tag including a start-tag, a matching end-tag and a list of context object types, and a plurality of action tags, each action tag including a start-tag, a matching end-tag, a first parameter identifying one or more supported context object types and a second parameter identifying the name of an action class defining the action to be performed;

receiving, via a selection receiving module, a selection from the user of the context object or a context indicator icon associated with, and displayed proximate to, the context object;

receiving, via the selection receiving module, a selection from the user of a context-specific action to be performed;

detecting, via an action listener, an event associated with the selected context-specific action for the context object; and performing the selected context-specific action based on the occurrence of the event detected by the action listener, wherein the smart tag framework is defined in one or more Extensible Markup Language (XML) smart tag configuration files.

14. The computer-implemented method of claim 13, wherein providing the context-specific actions to the user comprises displaying a popup menu populated with options based on the type of the context object.

15. The computer-implemented method of claim 13, wherein the type of the context object changes based on how the context object is used.

16. The computer-readable medium of claim 1, wherein the context object comprises a value attribute that is supplied to the one or more context-specific actions that may be performed for the context object so that the one or more context-specific actions operate on the value attribute, and the value attribute is contact information associated with the context object.

17. The context-based action determiner of claim 8, wherein the context object comprises a value attribute that is supplied to the one or more context-specific actions that may be performed for the context object so that the one or more context-specific actions operate on the value attribute, and the value attribute is contact information associated with the context object.

18. The computer-implemented method of claim 13, wherein the context object comprises a value attribute that is supplied to the one or more context-specific actions that may be performed for the context object so that the one or more context-specific actions operate on the value attribute, and the value attribute is contact information associated with the context object.

19. The computer-readable medium of claim 1, wherein the type of the context object includes a person or an address.

20. The computer-implemented method of claim 13, wherein the type of the context object includes a person or an address.

* * * * *